(12) United States Patent
Flaherty

(10) Patent No.: US 7,184,972 B2
(45) Date of Patent: Feb. 27, 2007

(54) RETAIL COUPON DISTRIBUTION APPARATUS AND METHOD

(75) Inventor: Paul A. Flaherty, Belmont, CA (US)

(73) Assignee: Overture Services, Inc., Pasadena, CA (US)

(*) Notice: Subject to any disclaimer, the term of this patent is extended or adjusted under 35 U.S.C. 154(b) by 609 days.

(21) Appl. No.: 10/022,149

(22) Filed: Dec. 14, 2001

(65) Prior Publication Data

US 2003/0115152 A1    Jun. 19, 2003

(51) Int. Cl.
*G06Q 1/14* (2006.01)
(52) U.S. Cl. .......................................... 705/14; 705/16
(58) Field of Classification Search ................ 455/519, 455/404, 456, 518, 414; 235/462.11, 462.19; 705/14, 65, 16
See application file for complete search history.

(56) References Cited

U.S. PATENT DOCUMENTS 6,135,354 A * 10/2000 Kubon .................. 235/462.11
6,542,750 B2 * 4/2003 Hendrey et al. ............ 455/456
2002/0071076 A1 * 6/2002 Webb et al. ................ 349/117
2003/0065805 A1 * 4/2003 Barnes ....................... 709/231

FOREIGN PATENT DOCUMENTS

JP     02001351001 A   * 12/2001

* cited by examiner

*Primary Examiner*—Elisca Pierre Eddy
(74) *Attorney, Agent, or Firm*—Dreier LLP

(57) ABSTRACT

A mobile communication system utilizes a mobile two-way communication device such as a cellular telephone, pager, personal digital assistant (PDA), palm-held computing device, and the like, connected to a network. The mobile two-way communication device has a display screen, such as an liquid crystal display (LCD) screen, that is capable of displaying a barcode. The image of a barcode is displayed on the two-way communication device by creating an optical image that can modulate a laser in motion, such as the laser used in a retail barcode scanning device.

30 Claims, 8 Drawing Sheets

RETAIL COUPON DISTRIBUTION APPARATUS AND METHOD

BACKGROUND OF THE INVENTION

1. Field of the Invention

The invention relates to techniques, systems, and devices for managing, generating, distributing, authenticating, and redeeming virtual discount coupons via a network.

2. Description of the Related Art

Coupons, most-typically for use in retail sales, are a marketing tool for introducing new products to the marketplace, introducing new customers to a product, or to otherwise stimulate interest in a product. Various types of coupons, including discount, special-offer, rebate coupons, and the like, are a common marketing strategy, particularly for consumer goods and food items that are typically sold at groceries, drug stores, and discount stores. Product sellers and manufacturers use coupons to introduce new products, promote new and existing products, and increase sales. One highly useful characteristic of a coupon system is the capability of obtaining demographic information of consumer buying patterns.

Although coupon systems have many positive attributes, improvements are possible. Businesses continually seek improvements in operating costs. Coupons are commonly placed as advertisements in direct mailings, newspapers, magazines, and the like. Costs to product manufacturers and sellers are commonly substantial for coupon advertising placements.

Paper coupons are expensive to produce, even more expensive to distribute, and fail to produce a rapid response in the marketplace. Printing and distribution costs of coupon advertising campaigns are substantial, commonly with a very low response rate. The low response rate highlights the inefficiency of coupon advertising campaigns and gives evidence of costs, such as disposal and handling costs, that are not directly borne by manufacturers and sellers but are shared among all of society.

Low response rates are further indicative of reluctance of potential customers to expend the effort to use coupons. Usage of coupons is not cost-free to the customer. Many potential customers do not invest the time, space, and other resources to collect, catalogue, store, and retrieve coupons, as well as to manage coupons having various expiration dates. Coupon handling is time-consuming and cumbersome.

Often, only consumers on a strict budget, with excess free time, or who enjoy couponing as a hobby have sufficient time to use coupons. Busy or more affluent consumers often do not consider coupon management to be a cost-effective usage of time. These busy and more affluent consumers represent a more desirable demographic for many product manufacturers and sellers.

Businesses that redeem the coupons bear similar storage, handling, and management costs, including expenditure of valuable employee time for retail store reimbursement. The system of clearing distributed and redeemed coupons involves physically sending redeemed coupons to a clearinghouse. The clearinghouse returns the coupons to the issuer and tallies debits and credits to the manufacturer and retailer. Physical handling of coupons is expensive, cumbersome, error prone, slow and prone to fraud.

Electronic distribution of retail coupons reduces cost in comparison to printed coupons, but require measures to prevent fraud. Proposed fraud prevention systems are either burdensome for the consumer or costly for retailers to implement.

Manufacturers use retail coupons to introduce consumers to new products, as well as to clear distressed inventory. Coupons are generally printed and passed to a distribution company, which either mails the coupons to consumers, or authorizes newspapers to print the coupons. Typical response rates are in the range from 3% to 5% for untargeted coupons, and in the range from 5% to 7% for coupons sent to likely target consumers. The coupons are used by consumers during a retail purchase transaction. A bar code on the coupon is scanned. The coupon is reported for anti-fraud purposes, and the appropriate price reduction is granted to the consumer. A the end of a sales period, typically a month, the retailer presents a report to the manufacturer who compensates the retailer for the coupons redeemed.

Various solutions have been attempted to solve these problems with coupons. One approach is to allow consumers to print their own coupons. This solution reduces distribution costs and latency, but requires the consumer to bring the paper coupon with them while shopping. The solution does not allow for opportunistic shopping, which accounts for the majority of retail purchases.

SUMMARY OF THE INVENTION

A mobile communication system utilizes a mobile two-way communication device such as a cellular telephone, pager, personal digital assistant (PDA), palm-held computing device, and the like, connected to a network. The mobile two-way communication device has a display screen, such as an liquid crystal display (LCD) screen, that is capable of displaying a barcode. The image of a barcode is displayed on the two-way communication device by creating an optical image that can modulate a laser in motion, such as the laser used in a retail barcode scanning device.

According to the present disclosure, a user of a two-way communication device engages in a method of distributing retail coupons by shopping at a retail store and deciding to purchase an item. The two-way communication device user determines whether a coupon is available for usage in the purchase by initiating communication with a coupon distribution application that executes on a mobile communication server. In a first type of transaction, the user enters a particular purchase item via the two-way communication device. The mobile communication server determines whether a coupon for the selected item is made available by the manufacturer. If so, the server replies to the user with information relating to a coupon. The information includes a barcode image for display on the display screen of the two-way communication device.

In a second type of transaction, the user may initiate a coupon request by identifying a generic type of product and transmit information concerning the product type to the server. The application executing on the server can perform a search to determine particular items for which manufacturers and sellers have made coupons available. The application sends catalog data to the user that specifies the particular items and coupon values available.

In a third type of transaction, a consumer may subscribe to a coupon service. The user has made available to the coupon service profile information specifying the user's product preferences. The coupon service sends the barcode coupons to the user occasionally or on a scheduled basis. The retailer or manufacturer can quickly communicate better prices to the user, for example to move distressed inventory.

Other types of transactions may be implemented including coupon searches for a particular manufacturer, a particular class of items, and the like.

The user determines whether to complete the purchase and, if so, displays the coupon barcode on the screen display. The user hands the two-way communication device to a retail clerk so that the barcode is scanned.

According to one aspect of the present invention, a communication application executable on a network including a client process executable on a processor in a two-way communication device, a server process executable on a processor communicatively coupled over the network to the client process; and a coupon depository coupled to the server process capable of storing a plurality of coupons. The two-way communication device includes a display screen capable of displaying a barcode image suitable for scanning by a barcode scanner. The coupons include an encoding of a barcode image. The server process include an operation of sending a coupon to the client process. The client process includes an operation for decoding the barcode image encoding and displaying the barcode image on the display screen for scanning by the barcode scanner.

According to another aspect of the invention, a communication application is executable on a network communicatively coupled to a server process. The communication application includes a client process executable on a processor in a two-way communication device. The two-way communication device includes a display screen capable of displaying a barcode image suitable for scanning by a barcode scanner. The client process includes an interactive input process capable of receiving input signals from the two-way communication device, a communication initiating process responsive to the input signals for sending application initiation signals to the server process via the network, and a communication receiving process responsive to communication signals from the server process for receiving coupon information from the server process. The coupon information includes an encoded barcode image. The client process further includes a display process responsive to the receipt of coupon information for decoding the encoded barcode image and displaying the barcode image.

According to a further aspect of the present invention, a communication application executable on a network includes an electronic coupon clearinghouse coupled to the network and containing a plurality of electronic coupons, a coupon database coupled to the electronic coupon clearinghouse; a server coupled to the network, and a two-way communication device capable of communicating on the network and receiving electronic coupons from the server via the network. The electronic coupons include an encoded barcode image. The server is capable of accessing the electronic coupon clearinghouse and receiving selected electronic coupons from the electronic coupon clearinghouse. The two-way communication device is capable of decoding the encoded barcode images and displaying the barcode images on a screen display for scanning by a barcode scanner.

BRIEF DESCRIPTION OF THE DRAWINGS

The features of the described embodiments are specifically set forth in the appended claims. However, embodiments of the invention relating to both structure and method of operation, may best be understood by referring to the following description and accompanying drawings.

DETAILED DESCRIPTION

Figure 1:
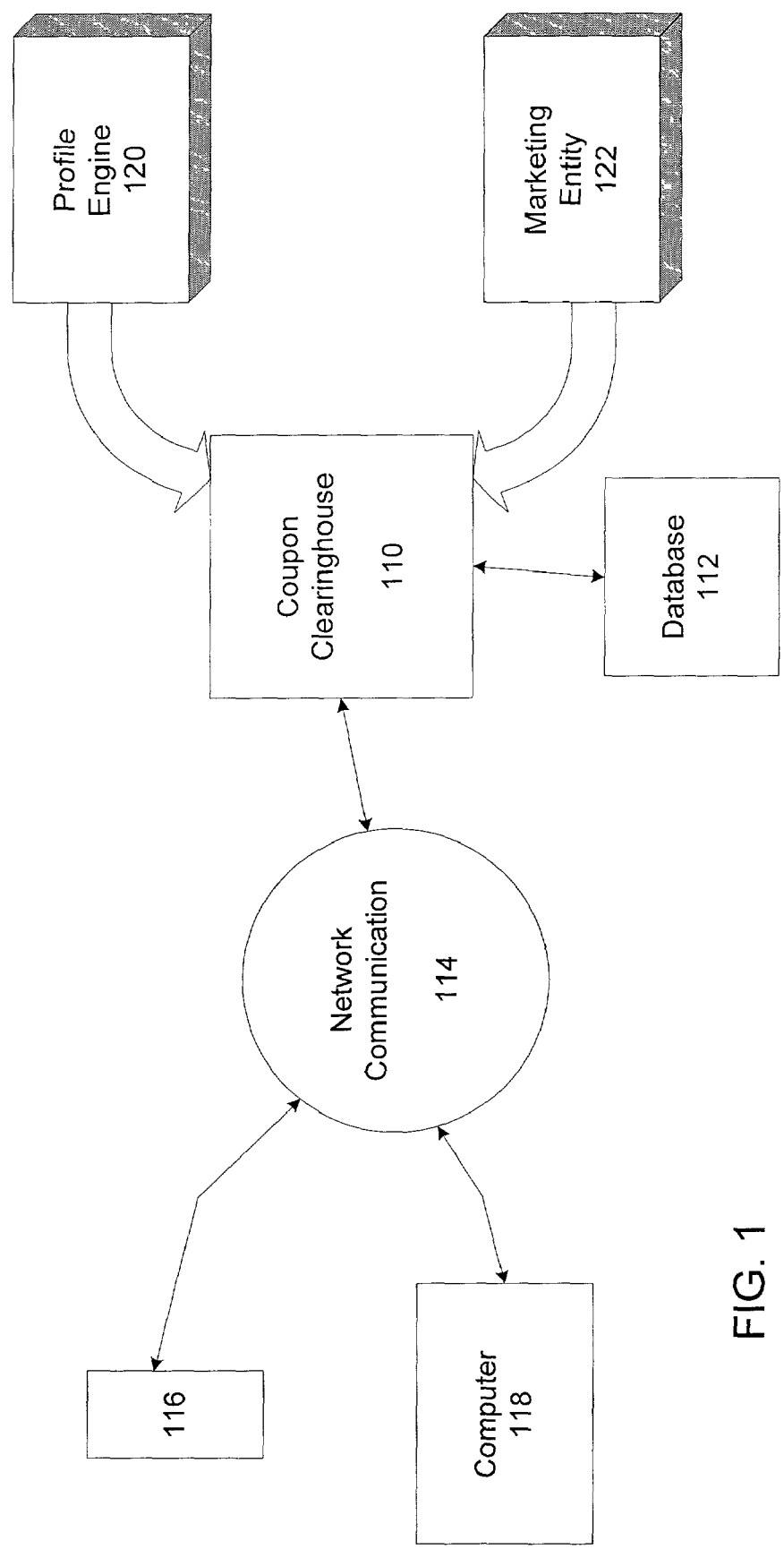
FIG. 1 is a schematic block diagram that illustrates an example of a retail coupon distribution system.

Referring to FIG. 1, a schematic block diagram illustrates an example of a retail coupon distribution system 100. The retail coupon distribution system 100 includes a coupon clearinghouse 110 for retailers and manufacturers. The coupon clearinghouse 110 contains a database 112 of coupons. Businesses such as retailers and manufacturers arrange for coupon information to be entered into the database 112. Consumers can access the database 112 via network communication 114 using a two-way communication device 116 or computer 118 access. The consumer can search the coupon database 112 from home, business, or using mobile access.

The coupon database 112 can be configured using a profile engine 120. The profile engine 120 sorts coupons into collections based on customer profile. The customer profile is a collection of predicates which identify the type, quantity, or quality of information that is presumed to be desirable to the customer.

Suitable customer profile engines are described in U.S. Pat. No. 6,108,645, entitled "Method and apparatus for efficient profile matching in a large scale webcasting system" to Eichstaedt, M et al., U.S. Pat. No. 6,035,336, entitled "Audio ticker system and method for presenting push information including pre-recorded audio" to Lu, Qi, et al, and U.S. Pat. No. 6,012,051, entitled "Consumer profiling system with analytic decision processor" to Sammon, Jr., T. M., et al, the disclosure of which are hereby incorporated by reference in their entirety.

A marketing entity 122 that may have an association with the coupon clearinghouse 110 delivers coupons to customer subscribers to a coupon service based on the customer profile. The marketing entity 122 delivers the electronic coupons via the network communication 114 to a customer's two-way communication device. Several marketing schemes may be employed by the marketing entity 122. In one example, the service delivers coupons on a regular scheduled basis, for example weekly. In another example, the service delivers coupons when a coupon of interest to the particular customer is made available by a retailer or manufacturer.

In a further example, the service may be granted access by a customer to location information regarding the customer. For example, the customer may activate global positioning system (GPS) locating information that identifies the location of the customer or the customer's two-way communication device. The service may be configured to deliver coupons to a customer when the customer's location is in the vicinity of a retailer that distributes a product that is determined to be of interest to the customer according to the customer profile.

Figure 2:
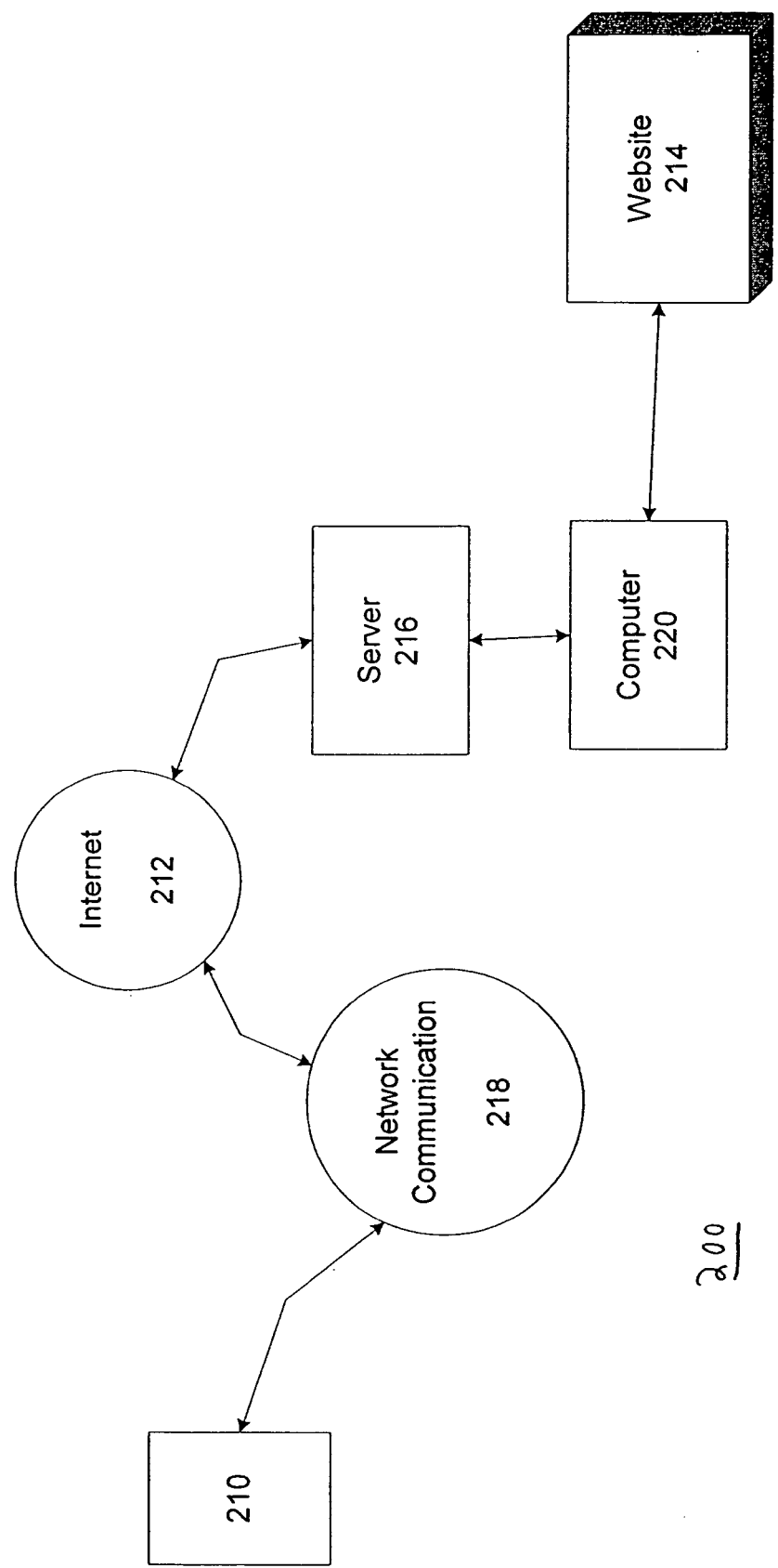
FIG. 2 is a highly schematic block diagram that illustrates a system for supplying information to a mobile device via the Internet.

Referring to FIG. 2, a highly schematic block diagram illustrates a mobile communication system 200 that supplies information to a mobile two-way communication device 210 via the Internet 212. The mobile communication system 200 supports two-way communication between the mobile device 210 and a web site 214 made available via the Internet 212. Companies that supply services and information via the Internet 212 can create mobile web site versions that allow user access on mobile devices such as cellular telephones, palm-held computing devices, pagers, and the like. Mobile web pages typically display text and images with a format and layout that are adapted for receipt and display by a mobile device. The mobile communication system 200 supports various content formats such as a Wireless Application Protocol (WAP), HDML, HTML, and Short Message Service Centers (SMS).

The mobile communication system 200 includes a server 216 with wireless communication capabilities, one or more wireless communication devices 210, and a wireless communication network 218 that facilitates communication between a wireless communication device 210 and the server 816. The wireless communication network 218 supports wireless data transport protocols such as Wireless Application Protocol (WAP) and Short Message Service Centers (SMS).

The Server 216 is connected to an application host computer 220 that stores and hosts applications that can be accessed by the wireless communication devices 210. The application host computer 220 supplies system support and maintenance services.

Information content that is made available by the application host computer 220 is communicated using SMS or WAP. Information is communicated via the wireless communication network 218 to the wireless communication device 210 and displayed on the wireless communication network 218 so that the user can read information from the screen and store information directly in the receiving wireless communication device 210.

Server 216 receives information content from any source and translates the information into an appropriate format and layout for transfer to the two-way communication device 210. The server 216 enables compatibility with legacy communication devices as well as new devices by supporting multiple types of information content sources, formats, device from factors, and transport protocols including WAP, HTML, and SMS.

Figure 3:
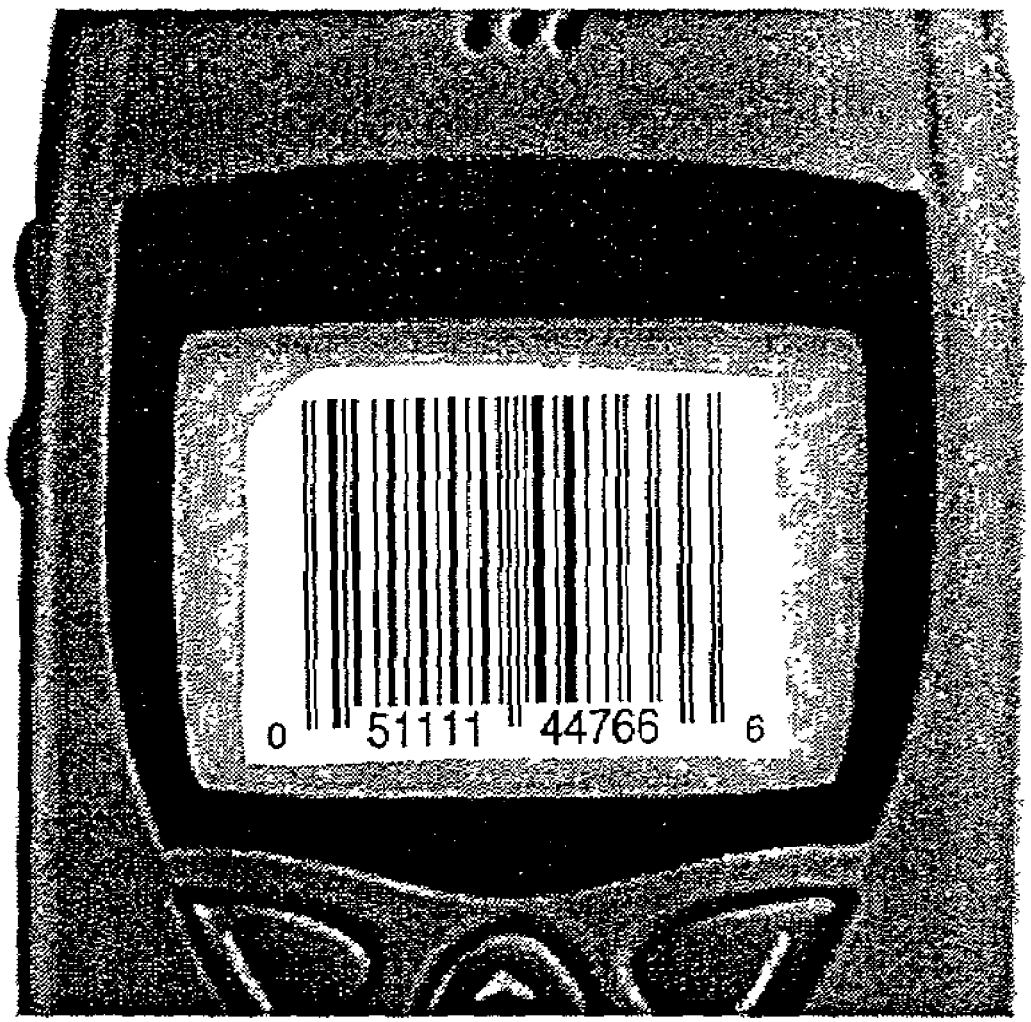
FIG. 3 is a pictorial view that shows an example of a cellular telephone screen imposed with a bar-code for usage in various embodiments of the retail distribution apparatus.

Referring to FIG. 3, a pictorial view shows an example of a cellular telephone screen imposed with a bar-code for usage in various embodiments of the retail distribution apparatus.

Figure 4:
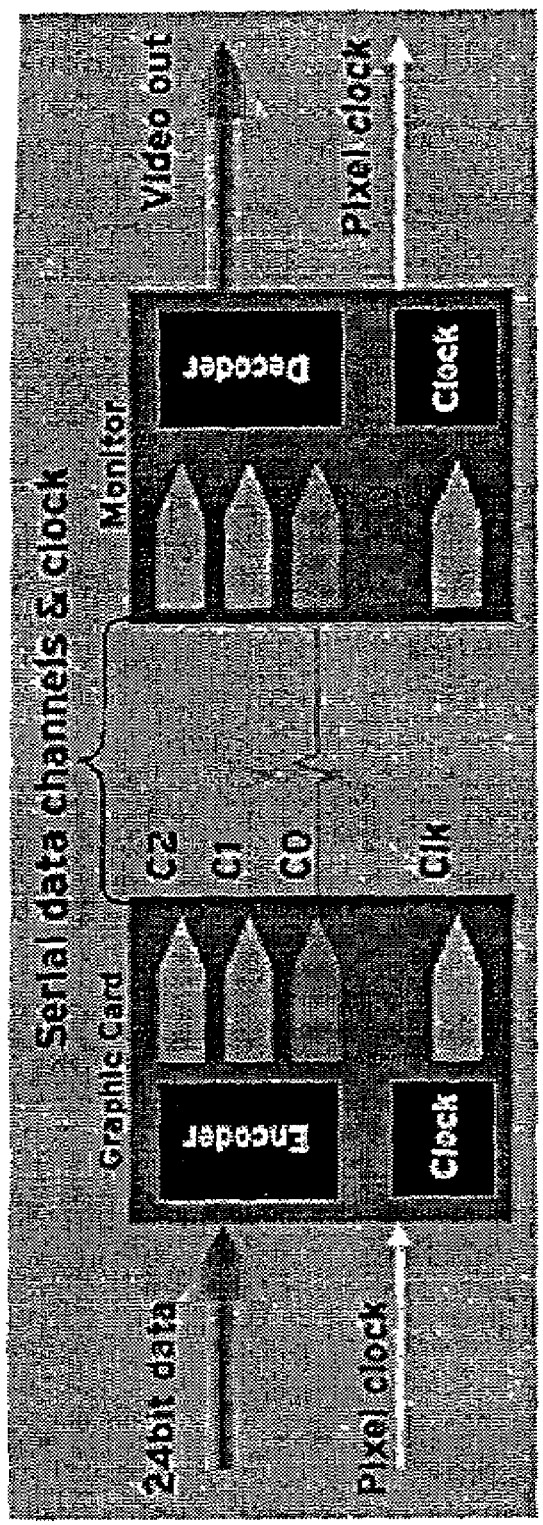
FIG. 4 depicts a schematic block diagram of a liquid crystal display (LCD) that is suitable for usage in the retail distribution apparatus.

Referring to FIG. 4, a schematic block diagram shows a liquid crystal display (LCD) 400 that is suitable for usage in the retail distribution system. The LCD display operates by altering the light transmissive properties of a field of liquid crystals. An image of a barcode is displayed on the two-way communication device by creating an optical image that can modulate a laser in motion, such as the laser used in a retail barcode scanning device.

Usage of a machine-readable barcode image on the LCD rather than long human-readable strings of digits enables usage of existing coupon infrastructure without change. Usage of the barcode image on the two-way communication device is more efficient and less cumbersome than usage of paper coupons. The barcode image immediately communicates information concerning the transaction to businesses in the transaction chain, from the retailer to manufacturers. Usage of the barcode image increases the amount of information that can be communicated. A downloaded coupon image can contain additional information to prevent coupon reuse, or tracking of usage.

Figure 5:
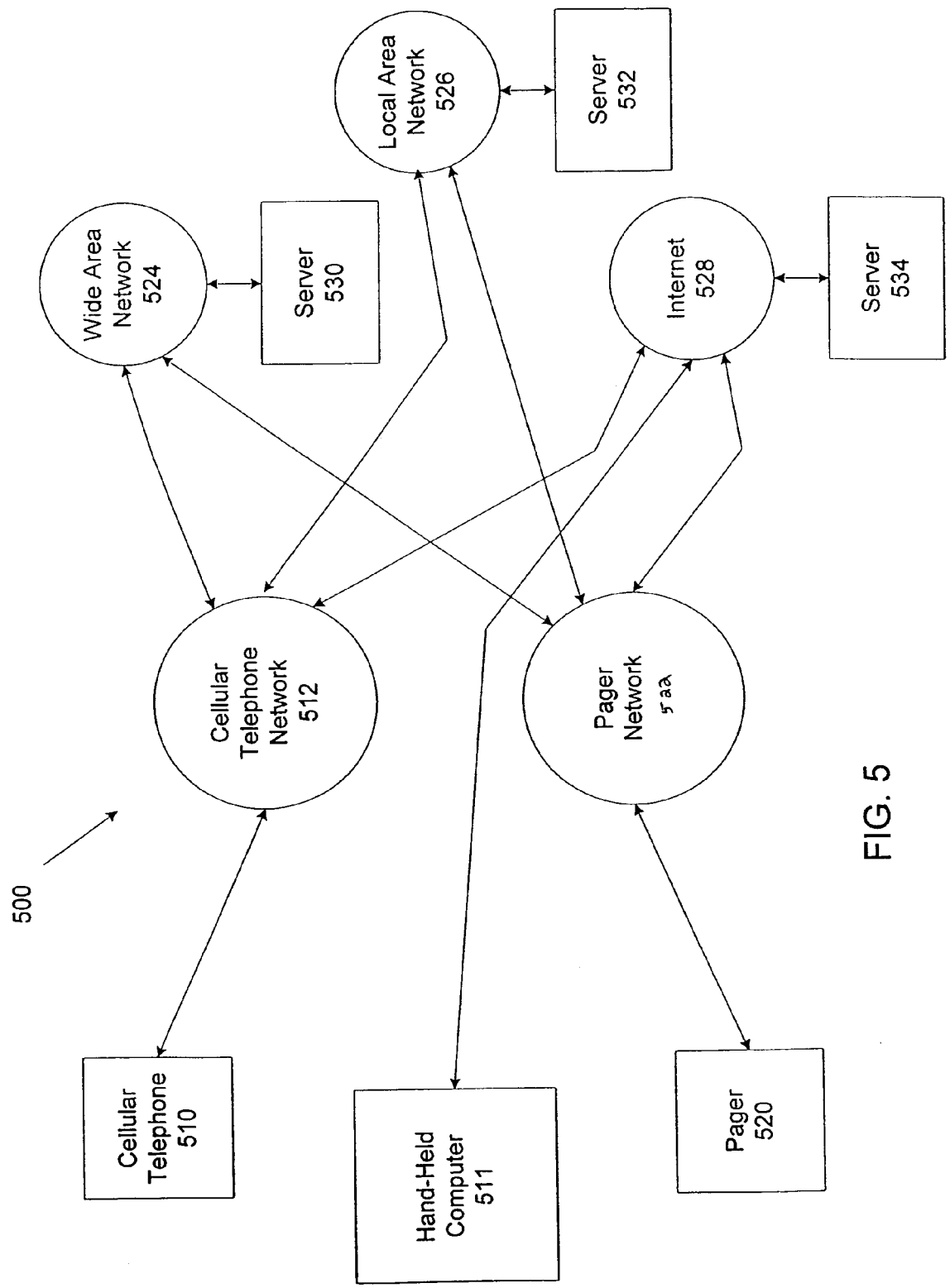
FIG. 5 is a schematic block diagram illustrating one example of a network and two-way data communication devices that are suitable for usage with the retail coupon distribution system and associated operating method.

Referring to FIG. 5, a two-way data communication network 500 is capable of interconnecting multiple two-way communication devices, such as cellular telephones 510, palm-held computing devices 511, pagers 520, or the like, with various communication networks.

Two-way data communication devices can be configured to transmit and receive information with selected computers and servers, for example servers 530, 532, and 534, that are connected to various networks such as a wide area network 524, a local area network 526, or an Internet 528. The communication network 500 is a two-way communication path that connects a two-way data communication device to a selected computer or server. The communication network 500 allows a user of the data communication device to activate and engage applications that execute in the selected computer or server.

The cellular telephone 510 or pager 520 can communicate over communication network 500 with any of the servers 530, 532, 534, or others (not shown) that are connected on the communication network 500 and include executable applications that communicate with processes loaded onto the cellular telephone 510 or pager 520. These communications permit the cellular telephone 510 or pager 520 to access information from any computers, servers, and other devices, such as other two-way communication devices, that are connected to the communication network 500. The communications also enable the cellular telephone 510 or pager 520 to supply information to the communication network 500. Similarly, any two-way communication device can be configured to communicate via the communication network 500 with any computers or servers that are connected to the communication network 500 and include any applications that communicate and interact with any processes loaded to the two-way communication device.

Server applications are accessible by any two-way data communication device that has access privileges to the server, independent of the device type and network type. Server applications are accessible to a two-way communications device in any location so long as the device can communicate with the communication network 500.

The two-way communication device, such as cellular telephone 510 or pager 520, includes an internal processor that is capable of executing a client process. Executable applications, called server processes, are capable of executing on servers 524, 526, and 528 connected to the communication network 500 and communicate with the client process.

Internal processors in the servers 530, 532, and 534 typically have higher processing capacity and performance than the size-limited processors internal to the cellular telephone 510 or pager 520. Processing tasks in the communicating device and the servers are typically balanced so that the processing load is more heavily distributed to the processor internal to the server.

The cellular telephone 510 has a telephone keypad and connects to the communication network 500 using a data capable cellular telephone network 512. The two-way pager 520 communicates with an application on one of the servers 530, 532, and 534 through a two-way pager network 522. The cellular telephone network 512 and the pager network 522 connect to the servers 530, 532, and 534 via a network such as the wide area network 524, the local area network 526, the Internet 528, or the like.

A client process in any two-way data communication device is stored as a client module in a memory, such as a nonvolatile memory, within the device. The client process executes various functions that are local to the communication device, including, for example, data display formatting, user interface input signal sensing, server communication packet formatting, receipt of information from the network, and conversion of input and output information.

The cellular telephone 510 or pager 520 has a client module that typically has a small storage capacity and low power consumption. The internal processor of the two-way communication device is typically a low-power circuit so that power consumption of the communicating device is small.

The two-way communication devices, the servers, and the communication network 500 permit a diverse variety of two-way data communication devices to function as open application platforms that allow system developers to create value-added-applications and services to a two-way data communication device. The communication network 500 can expand functionality of communication devices such as cellular telephones 510 or pagers 520 beyond closed, proprietary functionality to an open architecture that allows free creation of new applications and utilizations. New applications for cellular telephones 510 or pagers 520 can be created and implemented for usage by new and existing communication devices without physical modification of the devices. Applications are implemented independent of operating system compatibility constraints.

Hardware and software capabilities of the cellular telephones 510 or pagers 520 typically are fixed at time of manufacture since the devices do not have card slots or disk drives for adding or updating operations. However, the cellular telephones 510 or pagers 520 can be modified or upgraded for new functionality by downloading soft capabilities via communication channels.

To download applications, the client process executing on the cellular telephone 510 or pager 520 functions as an interpreter. A server application executing on any of the servers 530, 532, or 534 supplies information sufficient for the interpreter to generate a user interface on the client communication device. The user interface enables the two-way communication device to send messages and requests to the server. The server receives user selections and input data supplied by the user over the user interface and routes messages to a suitable server of the servers 530, 532, and 534, which may be the server that sent the original information. The client process interprets the received requests and information and controls circuits within the two-way communication device. Applications in the two-way communication device are updated by changes on the server, rather than modifications internal to the device. Accordingly, application software is distributed and implemented at the server level with the cellular telephone 510 or pager 520 exploiting modifications and updates to the applications via communication with the server.

In one example, a cellular telephone 510 or pager 520 can receive a response to a message from an application executing on one of the servers 530, 532, and 534 operating on the wide area network 524, the local area network 526, or Internet 528. An interpreter in the cellular telephone 510 or pager 520 generates a user interface on the display screen of the cellular telephone 510 or pager 520 using information in the message. Typically the display screen is a liquid crystal display (LCD) but other types of display technology may otherwise be used. Selections made via the user interface enable the user to access information or send information to one or more of the wide area network 524, the local area network 526, and the Internet 528.

Once the user interface is operating, the cellular telephone 510 or pager 520 sends a message that is accessed on a computer within one of the servers 530, 532, and 534. The computer responds to the message by executing an application. The application typically includes resource locators for applications that are executable from any computers within the servers 530, 532, and 534. In addition to the resource locators, the application includes common gateway and interface programs, and includes information for generating the user interface. When the user selects and operation or enters data, the interpreter accesses the selected resource locator and sends information to the resource locator to complete a communication link. The client process sends a message that identifies the resource locator to the selected server.

In this manner, applications that are installed on the wide area network 524, the local area network 526, and the Internet 528 send to a cellular telephone 510 or pager 520 sufficient information to generate a user interface and process information received from the cellular telephone 510 or pager 520. New applications can be added at the servers 530, 532, and 534 without any updating of the two-way communication devices.

The cellular telephones 510, pager 520, or other two-way communication devices, include data communication circuits, a multiple-line display screen, storage or memory. Data-capable cellular telephones, telephones that use a cellular digital packet data network, include an internal processor, internal memory and a multi-line display screen, hardware resources that are only rarely used. Additional capabilities enabled by applications installed on the servers 530, 532, and 534 greatly increase the utility of two-way communication devices with little impact on cost, size, and power consumption of the devices. By performing the applications using the processing capabilities and memory that are basic components of a cellular telephone 510 or pager 520, additional capabilities are available without additional costs or increases in size, weight, and battery life of the devices.

Operations of a two-way communication device are similar whether the device is a cellular telephone 510, pager 520, or other type of device.

In response to requests by a user, the cellular telephone 510 or pager 520 transmits a message such as a data request to a server of the servers 530, 532, and 534 on the cellular telephone network 512 or pager network 522. The server responds to the message by sending information to the requesting two-way communication device or, for some applications, by sending information to any specified device in the network. The other specified devices can be other users, such as other cellular telephone 510 or pager 520, or other computers connected to the servers 530, 532, and 534.

A cellular telephone 510 or pager 520 can receive a message from any computer connected to communication network 500.

The client process interpreter in cellular telephone 510 or pager 520 generates a user interface that enables the user to both initiate and respond to messages from many different types of applications. Interactions occur in real time. Capabilities are unconstrained by operations of the client process interpreter and are limited only by availability of applications on the connected servers.

Referring to FIG. 5, a cellular telephone user addresses a server to access a desired application or service. Accordingly, various computers or systems that connect to the servers 530, 532, and 534 must have sufficient information to permit communication with a particular cellular telephone 510 or pager 520. In one example, a cellular telephone 510 contacts a central computer over a data-capable cellular telephone network 512. The central computer is connected to multiple networks including the cellular telephone network 512, the pager network 522, one or more wide area networks 524, one or more local area networks 526, and the Internet 528. The cellular telephone user initiates an application by sending a message including a resource locator to the central computer. The central computer processes the message and retrieves information addressed by the resource locator from the appropriate network. After retrieving the requested information, the central computer generates screen images and transmits the screen images to cellular telephone 510. In some embodiments, a single computer is configured to communicate with the cellular telephone 510. In other systems, the computer can be configured to communicate with many or all other computer networks that can communicate with the cellular telephone 510.

Figure 6:
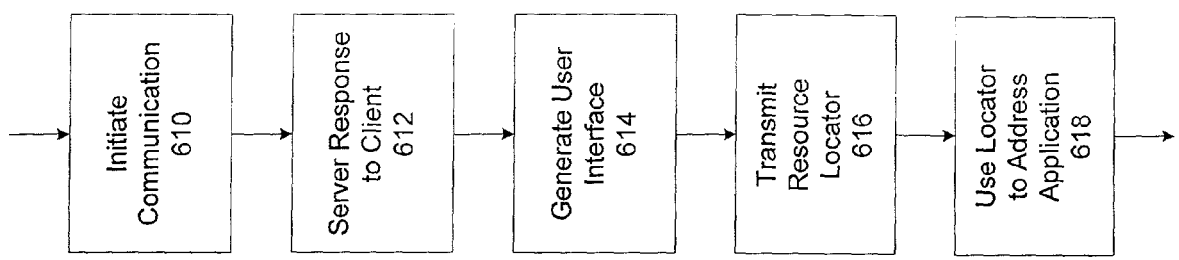
FIG. 6 is a highly schematic flow diagram that depicts an example of a communication operation between a two-way communication device such as a cellular telephone or pager and a servers.

Referring to FIG. 6, a highly schematic flow diagram depicts an example of a communication operation between a two-way communication device such as a cellular telephone 510 or pager 520 and one of the servers 530, 532, and 534. A client process that executes on a processor in the two-way communication device initiates an interaction with a selected server in an initiate communication operation 610. The selected server responds 612 by transmitting information to the client process to generate a user interface 614 and transmitting a resource locator 616 for possible selection by the user. The client process uses the resource locators to address applications 618 on the selected server or other servers, or applications on the selected server that access other servers. Applications that the user can access via the two-way communication device are limited only by the applications provided on the server computers. New or updated applications are supplied by adding or modifying executable modules on the server, without any change to the client process in the two-way communication device. The client process simply interprets information received from a server during execution of an application and transmits messages to request information from the server, client process requirements are unaffected by a new or updated application.

Figure 7:
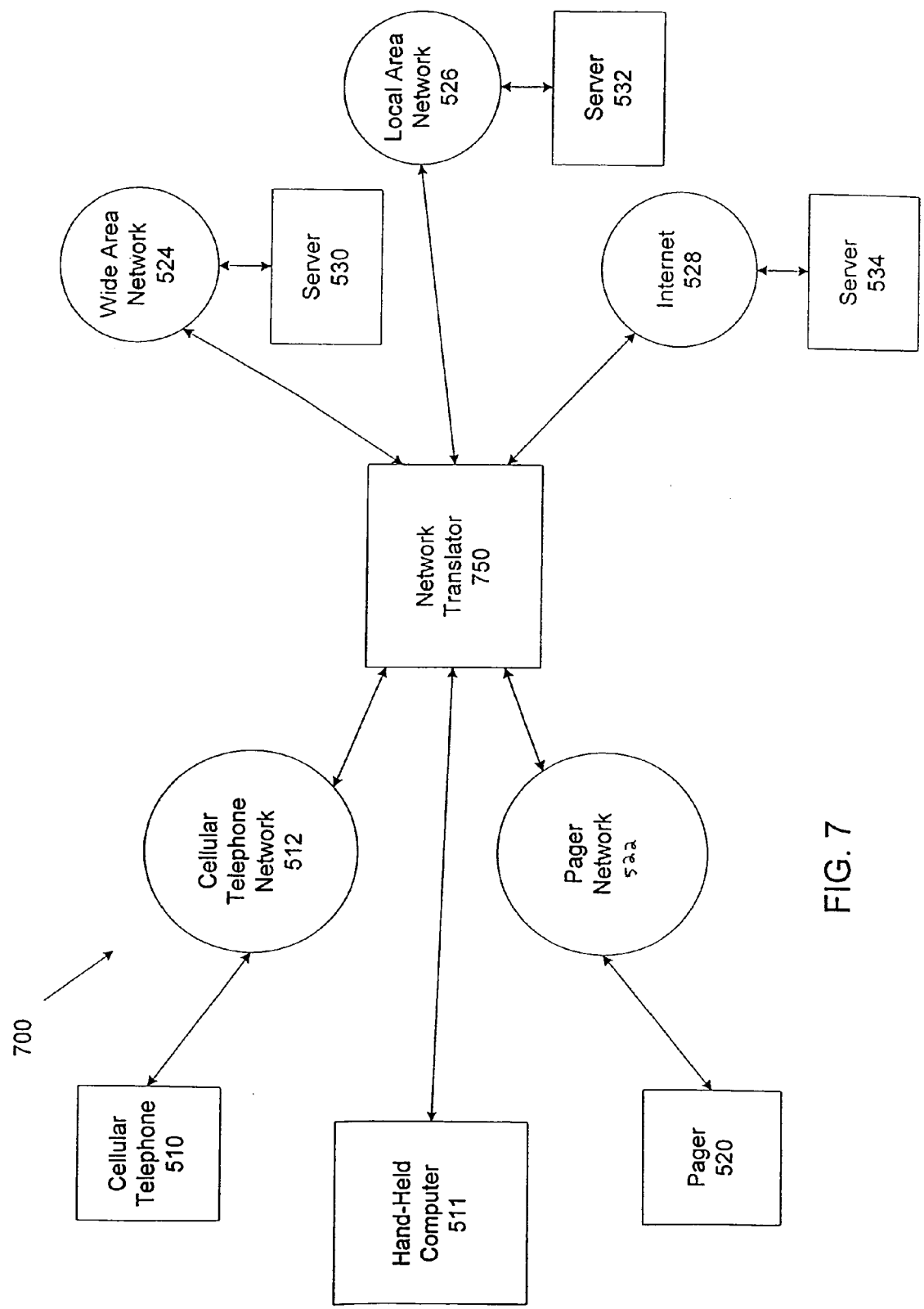
FIG. 7 is a schematic block diagram illustrating an example of a network with two-way data communication devices that includes a network translator.

Referring to FIG. 7, a schematic block diagram illustrates another example of a communication network 700. Messages from a two-way data communication device such as cellular telephone 510 or pager 520 are transmitted to a network translator 750. Network translator 750 and the two-way data communication device communicate using a point-to-point communication protocol for a network that links the network translator 750 and the two-way data communication device. A data-capable cellular telephone network 512 is a cellular digital packet data network that communicates either using a transmission control protocol (TCP) or a user datagram protocol (UDP).

Network translator 750 transfers data between the two-way data communication device and the selected computer network after translator 750 validates the communication path and may encrypt the message transferred to the computer network. Network translator 750 accumulates transaction and billing information for communication between the two-way data communication device and the selected computer network. For example, the network translator 750 may control access for paying services, log traffic records for billing purposes, and supply a user directory service.

Figure 8:
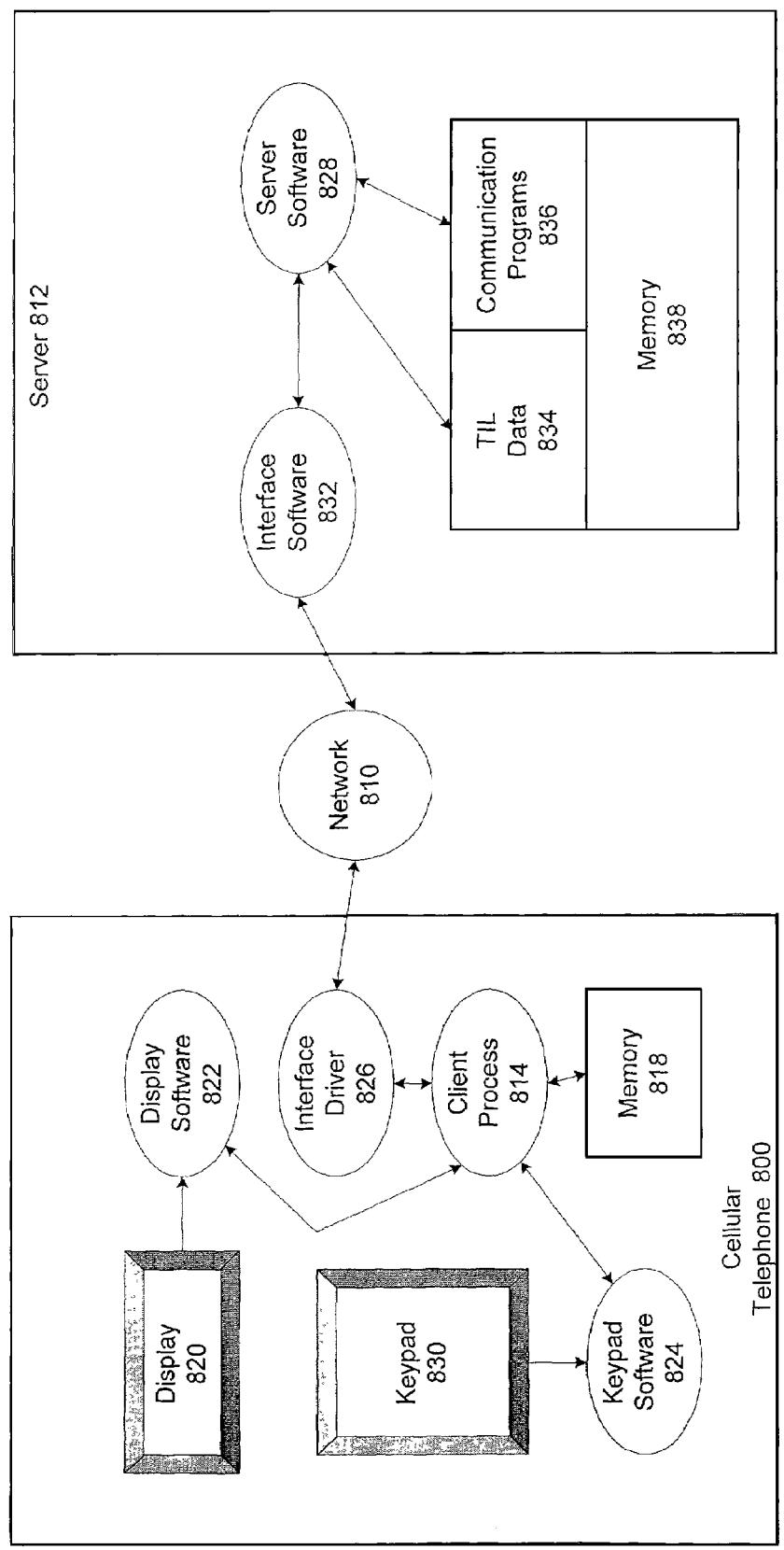
FIG. 8 is a schematic block diagram showing a mobile wireless communication device and a server in a network architecture that is suitable for usage with the retail coupon distribution system and associated operating method.

Referring to FIG. 8, a schematic block diagram illustrates an example of components that may be included in a suitable cellular telephone 800. The cellular telephone 800 includes circuitry and software that perform voice and data communication operations and modules for operation on network 810. The cellular telephone 800 interacts with a server 812 that includes a processor, storage, and applications software for executing applications on two-way communication devices such as the cellular telephone 800.

A client process 814 executes on a processor, such as a microcontroller, within digital cellular telephone 800. The client process 814 communicates with server 812 over a two-way data communication network, for example a cellular digital packet data (CDPD) network 816. Other suitable two-way data communication networks that are usable by cellular telephones are TDMA, CDMA, and GSM circuit switched data networks, and AMPS analog cellular network for usage with a modem. For a two-way communication device that is a pager, two-way data communication networks include PACT, or other priority two-way paging networks with data transport capability.

The digital cellular telephone 800 communicates with a server application on server 812 using telephone interaction description language (PIDL) and terminal interaction language (TIL) information formats. A process encoded in TIL is a compressed version of the same process written in PIDL. TIL facilitates parsing on the two-way data communication device, reducing memory requirements. Compression from PIDL to TIL typically occurs at run time. Compression of PIDL to TIL is highly useful since bandwidth across the cellular telephone network is limited.

Data types are compressed for optimal transfer over the two-way data communication network. For example, verbs in PIDL are compressed using a binary tokenization. Graphics are compressed using run-length-limited compression. Text is compressed using conventional text compression methods. Instructions in PIDL and TIL include information sufficient to generate a screen or a group of screens.

An operation is a related set of actions that are combined in a sequence so that no delay is incurred between actions. The server 812 stores applications in PIDL language and generates PIDL language modules in response to information or selections made by the cellular telephone 800.

Server 812 converts PIDL information to a TIL data and transmits the TIL data to cellular telephone 800. TIL is configured so that data can be stored unaltered in memory 818 of cellular telephone 800 and referenced directly with little or no parsing.

Interactions with a cellular telephone user is directed by information from the user to activate applications that are stored in a server. The user retrieves TIL data stored in a memory 818 of cellular telephone 800 after receiving the data from server 812 over a CDPD network 816. The user reviews the information in the TIL data and selects options or requests further information based on content of the information and the interaction desired by the user.

The cellular telephone 800 receives data from the server 812 and displays a first screen of information on a display screen 820. Screen information typically includes text, an image, or a combination of image and text. The user can respond to the screen, typically by actuating a NEXT key to view the next screen. The user can return to a previous screen by actuating a PREV key, enabling the user to navigate through the screens. While a screen is presented, the user can actuate a scroll key or scroll keys to move the portion of the screen display up and down. Other formatting configurations may be utilized for navigating through informational screens.

In some systems, three types of screen displays are used for two-way communication devices such as cellular telephones or pagers including display screens, select screens, and entry screens. Other systems may use additional types of screen displays. A display screen displays data and images to supply information to the user. A select screen displays a list of options for selection by the user. An entry screen displays one or more lines of text and entry spaces, lines, or selections that enable the user to enter information into the two-way communication device. The entry line can typically receive numeric information, text data, or actuation of a selection from among a group of choices.

In some systems, the choice and entry screens do not allow the user to navigate to a new screen until the user has entered requested information or selections. When the user reaches the last screen and actuates the NEXT key, the client process transmits user data and requests to the server and initiates a request for new information from the server. What information is requested is based on entries made by the user.

Software or firmware for driving the cellular telephone 800 includes display software 822, keyboard software 824, a client process 814, and UDP interface software 826. Memory 818 is a non-volatile memory of cellular telephone 800 that stores the client process 814. The client process 814 executes on a processor, such as a microcontroller, within cellular telephone 800. Display driver software 822, keyboard driver software 824, and interface driver software 826 operate under the control of the client process 814.

Client process 814 includes instructions that control the processor in cellular telephone 800 to perform application control operations. Operations include sending uniform resource locator (URL) requests to a HyperText Transfer Protocol (HTTP) server 828, parsing and displaying a TIL deck or decks returned by HTTP server 828, and generating new URLs based on the user's key presses. HTTP server software and platforms that can run the HTTP server software are described, for example, by Ian S. Graham, The HTML Sourcebook, John Wiley & Sons, Inc., New York, Chapt. 8, (1995), which is incorporated herein by reference.

A user datagram protocol (UDP) interface software 826 couples CDPD network 816 to client process 814, and allows client process 814 to communicate using UDP over CDPD network 816. UDP interface module 826 transmits stand-alone messages between connected devices.

Display software 822 is a display driver that displays information presented by the client process 814 on display screen 820. The client process 814 operates through the display software 822 to specify information presented on display screen 820. User interface manager software in client process 814 converts display data in the screen information to instructions for display software 822. The display software 822 generates signals that drive display hardware and control operation of display screen 820. For example, if the TIL data includes an image, the user interface manager module determines whether the requested screen contains a display of the image. If the requested screen data directs the user interface manager module to display the image, the user interface manager module passes the image in memory 818 to display software 822, displaying the image on display screen 820.

Client process 814 controls a keypad 830 on the two-way communication device via keyboard driver software 824. Client process 814 stores data representing keys pressed by the user on physical keypad 830 in memory 818. Keyboard driver software 824 signals client process 814 when the user has pressed a key. The client process 814 responds via user interface management software to convey information relating to the key press to display software 822. The display software 822 responds by displaying the suitable character on the display screen 820.

If the displayed screen is a select screen and the user actuates a key that corresponds to one of the choices, then the user interface manager sends instructions to display software 822 to highlight the selected item.

Software in the server 812 includes the HTTP server 828, UPD interface software 832, CGI programs 836 stored in a memory 838 of host server 812, and TIL data 834 stored in memory 838.

HTTP server 828 uses UPD interface software 832 to communicate TIL data 834 with CDPD network 816. HTTP server 828 converts static files containing PIDL information to TIL data. HTTP server 828 uses PIDL information that is produced by common gateway interface (CGI) programs 836 to produce TIL data. UDP interface software 840 and 826 interfaces to cellular telephone network 816 to transmit TIL data to client process 814. An application developer can produce an application in PIDL or CGI code to generate PIDL information for storage on server 812. The application is made available on network 810 for access by HTTP server 828 on Internet 528.

The PIDL and CGI code are independent of any particular two-way communication device for a network that supports UDP. Applications on HTTP server 828 are independent of the particular two-way data communication device in communication in the HTTP server 828. Applications on HTTP server 828 can communicate with any two-way data communication device that includes a suitable client process and suitable interface software for connecting to a two-way communication network.

While the invention has been described with reference to various embodiments, it will be understood that these embodiments are illustrative and that the scope of the invention is not limited to them. Many variations, modifications, additions and improvements of the embodiments described are possible. For example, those having ordinary skill in the art will readily implement the steps necessary to provide the structures and methods disclosed herein, and will understand that the process parameters, materials, and dimensions are given by way of example only and can be varied to achieve the desired structure as well as modifications which are within the scope of the invention. Variations and modifications of the embodiments disclosed herein may be made based on the description set forth herein, without departing from the scope and spirit of the invention as set forth in the following claims. For example, one or ordinary skill in the art could similarly apply the first and second quality-of-service techniques to the other interconnect structures described herein.

In the claims, unless otherwise indicated the article "a" is to refer to "one or more than one".

What is claimed is:

1. A communication application executable on a network comprising:
   a client process executable on a processor in a two-way communication device, the two way communication device including a display screen capable of displaying a barcode image suitable for scanning by a barcode scanner;
   a server process executable on a processor communicatively coupled over the network to the client process;
   a coupon depository coupled to the server process capable of storing a plurality of coupons, the coupons including an encoding of a barcode image, the server process including an operation of sending a particular coupon to the client process, the client process including an operation for decoding the respective barcode image encoding corresponding to the particular coupon and displaying the respective barcode image on the display screen; and
   the server process including an operation responsive to a global positioning signal locating a user position, the operation for determining whether the user position is in a vicinity near a retailer honoring a first coupon in the coupon depository and, if so, sending the first coupon to the user.

2. A communication application according to claim 1 further comprising:
   the client process including an operation for initiating a communication with the server process and requesting a first coupon for a selected item; and
   the server process including an operation for receiving the coupon request, determining whether the first a coupon is available, and, if so, transmitting the first coupon to the client process.

3. A communication application according to claim 1 further comprising:
   the client process including an operation for initiating a communication with the server process and requesting coupons for a generic class of items; and
   the server process including an operation for receiving the coupon request, determining coupons that are available for items in the generic class, and transmitting resultant requested coupons to the client process.

4. A communication application according to claim 1 further comprising:
   the server process including an operation for profiling users to determine collections of items of interest to associated classes of users according to user profiles; and
   the server process including an operation for sending one of the collections of items to one of the users in the associated class.

5. A communication application according to claim 1 wherein:
   the barcode includes tracking information for tracking usage of the particular coupon.

6. A communication application according to claim 1 wherein: the two-way communication device is selected from among a group consisting of cellular telephones, pagers, and palm-held computers.

7. An executable program code loadable from a storage media or downloadable from a communication source according to claim 1.

8. An article of manufacture encoding the executable program code according to claim 7.

9. A communication application executable on a network communicatively coupled to a server process, the communication application comprising:
   a client process executable on a processor in a two-way communication device, the two-way communication device including a display screen capable of displaying a barcode image suitable for scanning by a barcode scanner, the client process including:
   an interactive input process capable of receiving input signals for the two-way communication device;
   a communication initiating process responsive to the input signals for sending application initiation signals to the server process via the network;
   a communication receiving process responsive to communication signals from the server process for receiving coupon information from the server process, the coupon information including an encoded barcode image;
   a display process responsive to the receipt of the coupon information for decoding the encoded barcode image and displaying the barcode image; and
   wherein the server process is responsive to a global positioning signal locating a user position by determining whether the user position is in a vicinity near a retailer honoring a first coupon in the coupon depository and, if so, sending the first coupon to the user.

10. A communication application according to claim 9 further comprising:
    a request process for requesting coupons for a generic class of items; wherein the communication receiving process receives coupon information of one or more coupons for items in the generic class.

11. A communication application according to claim 9 further comprising:
    a request process for requesting coupons for a generic class of items; wherein
    the communication receiving process receives coupon information of one or more coupons for items in the generic class; and the application further comprises
    an interactive access process for displaying coupons, scrolling through coupons, and selecting coupons under direction of user signals.

12. A communication application according to claim 9 wherein:
    the two-way communication device is selected from among a group consisting of cellular telephones, pagers, and palm-held computers.

13. An executable program code loadable from a storage media or downloadable from a communication source according to claim 9.

14. An article of manufacture encoding the executable program code according to claim 13.

15. A communication application executable on a network comprising:
    an electronic coupon clearinghouse coupled to the network and containing a plurality of electronic coupons, the electronic coupons including respective encoded barcode images;
    a coupon database coupled to the electronic coupon clearinghouse;
    a server coupled to the network, the server capable of accessing the electronic coupon clearinghouse and receiving selected electronic coupons from the electronic coupon clearinghouse;
    a two-way communication device capable of communicating on the network and receiving electronic coupons from the server via the network, the two-way communication device capable of decoding the encoded barcode images and displaying the barcode images on a screen display; and wherein the server is responsive to a global positioning signal locating a user position by determining whether the user position is in a vicinity near a retailer honoring a particular coupon in the coupon depository and, if so, sending the particular coupon to the user.

16. A communication application according to claim 15 further comprising:

a profile engine coupled to the network and accessible by the server that generates user profiles and creates a collection of coupons according to the user profiles.

17. A communication application according to claim 15 wherein:

the two-way communication device initiates communication with the server and requests a particular coupon for a specific item; and the server determines whether the particular coupon for the specific item is available in the coupon database and, if so, sends the particular coupon to the two-way communication device.

18. A communication application according to claim 15 wherein:

the two-way communication device initiates communication with the server and requests coupons for a class of items: and the server searches the coupon database for coupons included within the class of items and sends any results to the two-way communication device.

19. A communication application according to claim 15 further comprising:

a profile engine coupled to the network and accessible by the server that generates user profiles and creates a collection of coupons according to the user profiles, wherein the server periodically searches the coupon database for coupons included within the collection of coupons for a particular user profile and sends any resultant coupons in the collection to the two-way communication device.

20. A communication application according to claim 15 wherein: the two-way communication device is selected from among a group consisting of cellular telephones, pagers, and palm-held computers.

21. A system for providing a user of a two-way communication device with an electronic coupon, the system comprising:

a network;

a two-way communication device connected to and forming at least part of the network, the two-way communication device including a display;

a server connected to and forming at least part of the network;

a coupon depository connected to the server, the coupon depository storing a plurality of coupons, at least some of the coupons including an associated barcode image; wherein the server is effective to forward select coupons and associated barcode images to the two-way communication device in response to a global positioning signal locating a user position by determining that the user is in a vicinity near a retailer honoring the select coupon from the coupon depository; and the two-way communication device is effective to receive the select coupons and associated barcode images and display the barcode images on the display.

22. The system as recited in claim 21, wherein: the two-way communication device is effective to forward a request to the server for a particular coupon; and the server is effective to search the coupon depository and forward the particular coupon to the two-way communication device when the particular coupon is stored in the coupon depository.

23. The system as recited in claim 21, wherein the server is effective to forward a particular coupon to the two-way communication device based on a user profile.

24. The system as recited in claim 21, wherein: the two-way communication device further generates a global positioning signal;

the server is effective to read the global positioning signal and to forward a particular coupon to the two-way communication device based on the global positioning signal.

25. The system as recited in claim 21, wherein the two-way communication device is one of a cell phone, a pager, and a palm-held computer.

26. A method for providing a user of a two-way communication device in a network with an electronic coupon, the network including a server and a coupon depository connected thereto, the coupon depository storing a plurality of coupons, at least some of the coupons including an associated barcode image, the two-way communication device including a display, the method comprising:

forwarding select coupons and associated barcode images to the two-way communication device from the server in response to a global positioning signal locating a user position by determining that the user position is in a vicinity near a retailer honoring a particular coupon in a coupon depository;

receiving the select coupons and associated barcode images at the two-way communication device; and displaying the barcode images on the display.

27. The method as recited in claim 26, further comprising: sending a request to the server from the two-way communication device for a particular coupon;

searching the coupon depository; and forwarding the particular coupon to the two-way communication device when the particular coupon is stored in the coupon depository.

28. The method as recited in claim 26, further comprising forwarding a particular coupon to the two-way communication device based on a user profile.

29. The method as recited in claim 26, further comprising: generating a global positioning signal at the two-way communication device; reading the global positioning signal at the server; and forwarding a particular coupon to the two-way communication device based on the global positioning signal.

30. The method as recited in claim 26, wherein the two-way communication device is one of a cell phone, a pager, and a palm-held computer.

* * * * *